(12) United States Patent
Sundaram et al.

(10) Patent No.: US 7,424,641 B2
(45) Date of Patent: Sep. 9, 2008

(54) CONTROL SYSTEM AND METHOD FOR VALIDATING OPERATION OF THE CONTROL SYSTEM

(75) Inventors: Padma Sundaram, West Bloomfield, MI (US); Yulei Chen, Plymouth, MI (US); Joseph G. D'Ambrosio, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 722 days.

(21) Appl. No.: 11/099,871

(22) Filed: Apr. 6, 2005

(65) Prior Publication Data
US 2006/0236844 A1 Oct. 26, 2006

(51) Int. Cl.
*G06F 11/00* (2006.01)

(52) U.S. Cl. .......................... 714/11; 700/81
(58) Field of Classification Search ................ None
See application file for complete search history.

(56) References Cited

U.S. PATENT DOCUMENTS

| | | | |
|---|---|---|---|
| 4,881,227 A | 11/1989 | Buhren | 371/9 |
| 5,204,952 A * | 4/1993 | Ayers et al. | 714/48 |
| 5,526,267 A * | 6/1996 | Sogawa | 701/114 |
| 5,563,799 A | 10/1996 | Brehmer et al. | 364/481 |
| 5,671,141 A | 9/1997 | Smith et al. | 364/424.034 |
| 5,956,474 A * | 9/1999 | Bissett et al. | 714/11 |
| 6,330,499 B1 | 12/2001 | Chou et al. | 701/33 |
| 6,523,139 B1 | 2/2003 | Banning et al. | 714/43 |
| 6,744,616 B2 | 6/2004 | Odorcic | 361/160 |
| 2004/0078731 A1 | 4/2004 | Becher et al. | 714/55 |
| 2005/0223274 A1* | 10/2005 | Bernick et al. | 714/11 |

(Continued)

FOREIGN PATENT DOCUMENTS

GB    2 207 307 A    1/1989

OTHER PUBLICATIONS

Terry L. Fruehling, Delphi Secured Microcontroller Architecture, SAE Technical Paper Series 2000-01-1052, Mar. 6, 2000.

(Continued)

*Primary Examiner*—Gabriel L Chu
(74) *Attorney, Agent, or Firm*—Michael D. Smith

(57) ABSTRACT

A control system and a method for validating operation of the control system are provided. The control system has a first controller operably communicating with a second controller. The first and second controllers have first and second read-only memories, respectively. The method includes executing a first software program in the first controller that retrieves a first key value from the second controller. The method further includes retrieving a second key value from a table using the first key value as an index value. The table is stored in a memory that is accessible by the first software program. The method includes executing at least one mathematical operation in the first software program using at least the second key value to obtain a third key value. The method further includes sending the first and third key values from the first controller to the second controller. The method further includes determining a first validation value based on the first key value utilizing the second controller. The method further includes comparing the third key value to the first validation value using the second controller and indicating that the first software program has executed until completion when the third key value is equal to the first validation value.

23 Claims, 14 Drawing Sheets

U.S. PATENT DOCUMENTS

2005/0246578 A1* 11/2005 Bruckert et al. ............... 714/11
2006/0200257 A1* 9/2006 Kirste et al. .................. 700/79

OTHER PUBLICATIONS

John A. McDermid, David J. Pumfrey, Safety Analysis of Hardware/Software Interactions in Complex Systems, University of York.

Rajesh Venkatasubramanian, John P. Hayes and Brian T. Murray, Advanced Computer Architecture Laboratory University of Michigan, Delphi Automotive Systems, Low-Cost On-Line Fault Detection Using Control Flow Assertions.

Advanced Computer Architecture Lab University of Michigan, Design of Self-Testing Controllers, Jun. 29, 2002.

Naoya Chujo, R & D Review of Toyota CRDL vol. 37 No. 2, Fail-safe ECU System Using Dynamic Reconfiguration of FPGA, Apr. 17, 2002.

Aamer Mahmood, IEEE Transactions on Computers, vol. 37, No. 2, Concurrent Error Detection Using Watchdog Processors A Survey, Feb. 1988.

* cited by examiner

CONTROL SYSTEM AND METHOD FOR VALIDATING OPERATION OF THE CONTROL SYSTEM

TECHNICAL FIELD

This application relates to a control system and a method for validating operation of the control system.

BACKGROUND

Control systems utilize controllers for controlling external devices. Each controller has a central processing unit (CPU) that executes at least one software program for controlling the devices. If the CPU does not operate as desired, a software program executing therein may not execute correctly (e.g., in a predetermined sequence) until completion, as desired.

Accordingly, the inventors herein have recognized a need for a system and a method for determining whether a software program is being executed correctly until completion in a controller.

SUMMARY

A method for validating operation of a control system in accordance with an exemplary embodiment is provided. The control system has a first controller operably communicating with a second controller. The first and second controllers have first and second read-only memories, respectively. The method includes executing a first software program in the first controller that retrieves a first key value from the second controller. The method further includes retrieving a second key value from a table using the first key value as an index value. The table is stored in a memory that is accessible by the first software program. The method includes executing at least one mathematical operation in the first software program using at least the second key value to obtain a third key value. The method further includes sending the first and third key values from the first controller to the second controller. The method further includes determining a first validation value based on the first key value utilizing the second controller. The method further includes comparing the third key value to the first validation value using the second controller and indicating that the first software program has executed until completion when the third key value is equal to the first validation value.

A control system in accordance with another exemplary embodiment is provided. The control system includes a first controller configured to execute the first software program. The control system further includes second controller configured to operably communicate with the first controller. The first software program is configured to retrieve a first key value from the second controller. The first software program is further configured to retrieve a second key value from a table using the first key value as an index value. The table is stored in a memory that is accessible by the first software program. The first software program is further configured to execute at least one mathematical operation using at least the second key value to obtain a third key value. The first software program is further configured to send the first and third key values from the first controller to the second controller. The second controller is further configured to determine a first validation value based on the first key value. The second controller is further configured to compare the third key value to the first validation value and to indicate that the first software program has executed until completion when the third key value is equal to the first validation value.

DESCRIPTION OF EXEMPLARY EMBODIMENTS

Figure 1:
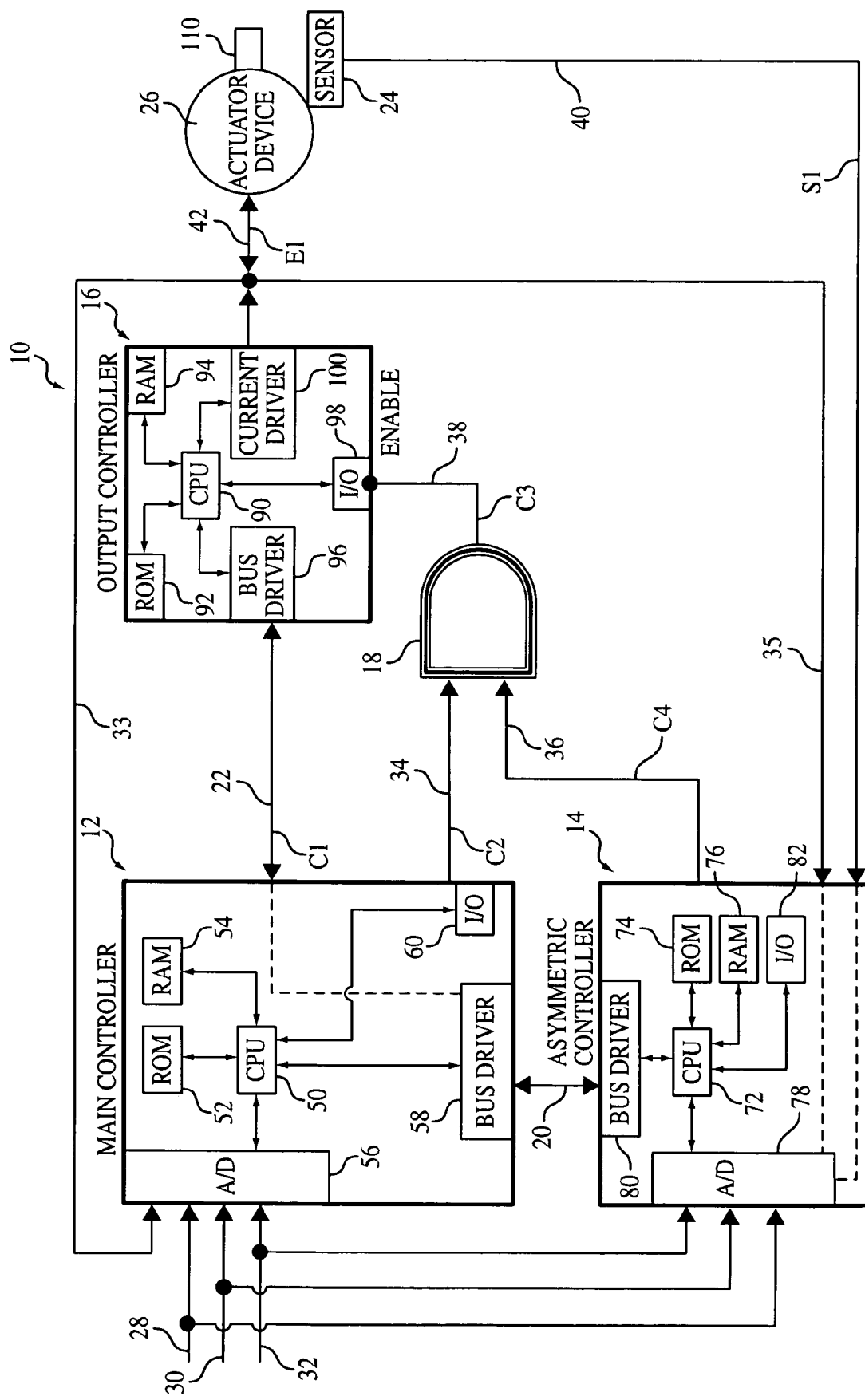
FIG. 1 is a schematic of a control system in accordance with an exemplary embodiment.

Referring to FIG. 1, a control system 10 in accordance with an exemplary embodiment is illustrated. The control system 10 implements a method for validating operation thereof as will be explained in further detail below. The control system 10 includes a main controller 12, an asymmetric controller 14, an output controller 16, an AND logic gate 18, a communication bus 20, a communication bus 22, a sensor 24, an actuator device 26, signal lines 28, 30, 32, 34, 36, 40, and a load line 42.

The main controller 12 is provided to generate a control signal (C1) for inducing the output controller 16 to generate an energization signal for controlling the actuator device 26. The main controller 12 is further provided to communicate with the asymmetric controller 14 for monitoring operation of the asymmetric controller 14. The main controller 12 is further provided to generate a signal (C2) for activating or deactivating the output controller 16. The controller 12 includes a CPU 50 operably communicating with a read-only memory (ROM) 52, a random access memory (RAM) 54, an analog-to-digital (A/D) converter 56, a bus driver 58, and an I/O interface 60.

The ROM 52 and the RAM 54 are provided to store executable software instructions utilized by the CPU 50. The ROM 52 and RAM 54 can be implemented using any of a number of known memory devices such as PROMs, EPROMs, EEPROMS, flash memory or any other electric, magnetic, optical or combination memory device, for example.

The A/D converter 56 is operably coupled to signal lines 28, 30, 32, and 33 and is provided to sample analog signals transmitted through the signal lines 28, 30, 32, and 33.

The bus driver 58 is provided to transmit messages through the communication bus 20 to the asymmetric controller 14 and to receive messages from the asymmetric controller 14 through the communication bus 20.

The I/O interface 60 is provided to generate a control signal (C2) that is received by the AND logic gate 18. When the controller 12 detects an operational fault condition, the controller 12 induces the I/O interface 60 to set the control signal (C2) to a low logic level which induces the AND logic gate 18 to output a control signal (C3) having a low logic level. In response, the output controller 16 is disabled and an energization signal (E1) is removed from the load line 42. When the controller 12 does not detect an operational fault condition, the controller 12 sets the control signal (C2) to a high logic level which induces the AND logic gate 18 to output a control signal (C3) having a high logic level. In response to control signals (C3) and (C4) having high logic levels, the output controller 16 is enabled and generates an energization signal (E1) on the load line 42 in response to the control signal (C1) from the controller 12.

The asymmetric controller 14 is provided to monitor operation of the main controller 12. The controller 14 includes a CPU 72 operably communicating with a ROM 74, a RAM 76, an A/D converter 78, a bus driver 80, and an I/O interface 82.

The ROM 74 and the RAM 76 are provided to store executable software instructions utilized by the CPU 72. The ROM 74 and RAM 76 can be implemented using any of a number of known memory devices such as PROMs, EPROMs, EEPROMS, flash memory or any other electric, magnetic, optical or combination memory device, for example.

The A/D converter 78 is operably coupled to signal lines 28, 30, 32, 33, 35 and 40 and is provided to sample analog signals transmitted through the signal lines 28, 30, 32, 33, 35 and 40.

The bus driver 80 is provided to transmit messages through the communication bus 20 to the main controller 12 and to receive messages from the main controller 12 through the communication bus 20.

The I/O interface 82 is provided to generate a control signal (C4) that is transmitted via signal line 36 to the AND logic gate 18. When the controller 14 detects an operational fault condition, the controller 14 induces the I/O interface 82 to set the control signal (C4) to a low logic level which induces the AND logic gate 18 to output a control signal (C3) having a low logic level. In response, the output controller 16 is disabled and an energization signal (E1) is removed from the load line 42. When the controller 14 does not detect the operational fault condition, the controller 14 sets the control signal (C4) to a high logic level which induces the AND logic gate 18 output a control signal (C3) having a high logic level. In response to the control signals (C3) and C4) having high logic levels, the output controller 16 is enabled and generates an energization signal (E1) on the load line 42 based on the control signal (C1) from the controller 12.

The output controller 16 is provided to generate an energization signal (E1) for controlling an actuator device 26 in response to a control signal (C1) from the main controller 12. The controller 16 includes a CPU 90 operably communicating with a ROM 92, a RAM 94, a bus driver 96, an I/O interface 98, and a current driver 100.

The ROM 92 and the RAM 94 are provided to store executable software instructions utilized by the CPU 90. The ROM 92 and RAM 94 can be implemented using any of a number of known memory devices such as PROMs, EPROMs, EEPROMS, flash memory or any other electric, magnetic, optical or combination memory device, for example.

The bus driver 96 is provided to transmit messages through the communication bus 22 to the main controller 12 and to receive messages from the main controller 12 through the communication bus 22.

The I/O interface 98 is provided to receive a control signal (C3) for enabling or disabling the output controller 16. When the control signal (C3) has a high logic level, the CPU 90 is enabled and the energization signal (E1) is output from the current driver 100 based on the control signal (C1) from the main controller 12. Alternately, when the control signal (C3) has a low logic level, the CPU 90 is disabled and the energization signal (E1) is not output from the current driver 100.

The actuator device 26 is provided to move an actuator member 110 in response to the energization signal (E1). The actuator device 26 can comprise electrical motor, an electrical or hydraulic pump, or a pneumatic device, for example.

The sensor 24 is provided to measure an operational parameter of the actuator device 26. The sensor 24 is disposed proximate the movable member 110 and generates a signal (S1) indicative of an operational parameter of the actuator device 26 that is transmitted through the signal line 40 to the controller 14.

Figure 2:
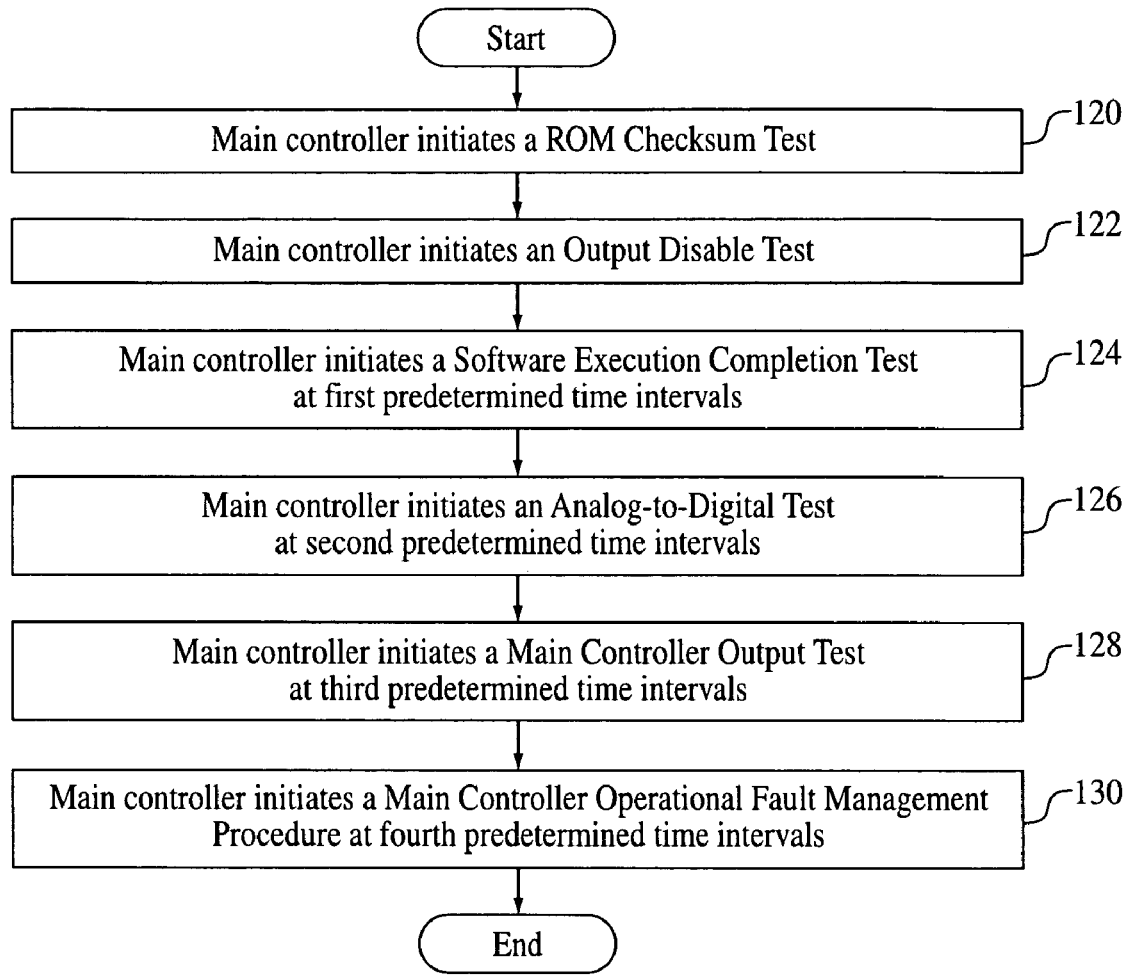
FIGS. 2-14 are flowcharts of a method for validating operation of a control system in accordance with another exemplary embodiment.

Referring to FIG. 2, a method for validating operation of the control system 10 in accordance with an exemplary embodiment will now be explained. The method is implemented these utilizing software algorithms in the main controller 12, the asymmetric controller 14, and the output controller 16—and is initiated by the main controller 12.

Figure 3:
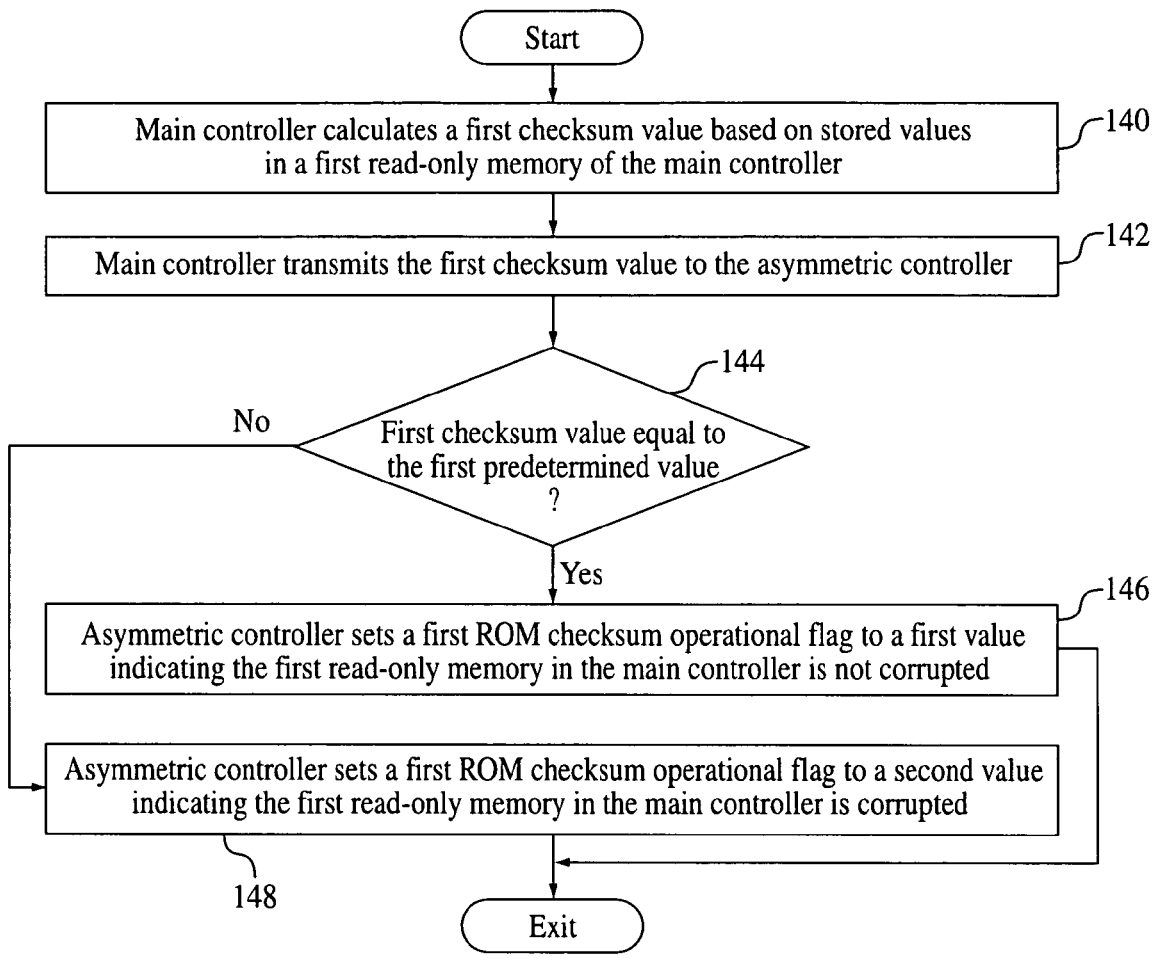

At step 120, the main controller 12 initiates a ROM Checksum Test. Referring to FIG. 3, the step 120 is implemented utilizing steps 140-148.

At step 140, the main controller 12 calculates a first checksum value based on stored values in the ROM 52 of the main controller 12.

At step 142, the main controller 12 transmits the first checksum value to the asymmetric controller 14.

At step 144, the asymmetric controller 14 makes a determination as to whether the first checksum value is equal to a first predetermined value. If the value of step 144 equals "yes", the method advances to step 146. Otherwise, the method advances to step 148.

At step 146, the asymmetric controller 14 sets a first ROM checksum operational flag to a first value indicating the ROM 52 in the main controller 12 is not corrupted. After step 146, the method advances to step 122.

At step 148, the asymmetric controller 14 sets a first ROM checksum operational flag to a second value indicating the ROM 52 in the main controller 12 is corrupted. After step 148, the method advances to step 122.

Figure 4:
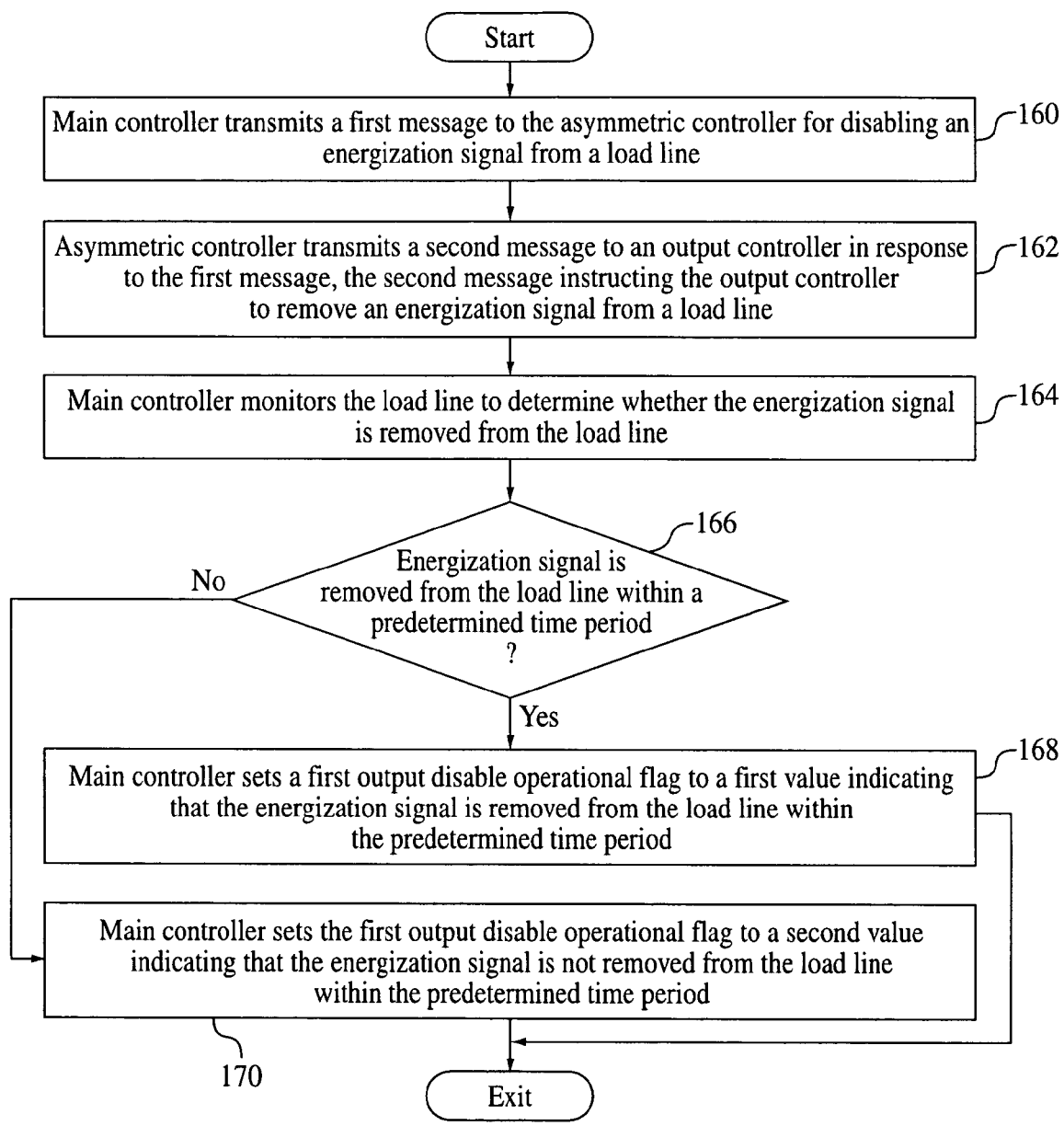

Referring to FIGS. 2 and 4, after step 120 is completed, the step 122 is performed. At step 122, the main controller 12 initiates an Output Disable Test. The step 122 is implemented utilizing steps 160-170.

At step 160, the main controller 12 transmits a first message to the asymmetric controller 14 for disabling an energization signal (E1) from a load line 42.

At step 162, the asymmetric controller 14 transmits a second message to the output controller 16 in response to the first message, the second message instructing the output controller 16 to remove the energization signal (E1) from the load line 42.

At step 164, the main controller 12 monitors the load line 42 to determine whether the energization signal (E1) is removed from the load line 42.

At step 166, the main controller makes a determination as to whether the energization signal (E1) is removed from the load line 42 within a predetermined time period. If the value of step 166 equals "yes," the method advances to step 168. Otherwise, the method advances to step 170.

At step 168, the main controller 12 sets a first output disable operational flag to a first value indicating that the energization signal (E1) is removed from the load line 42 within the predetermined time period. After step 168, the method advances to step 124.

At step 170, the main controller 12 sets the first output disable operational flag to a second value indicating that the energization signal (E1) is not removed from the load line 42 within the predetermined time period. After step 170, the method advances to step 124.

Figure 5:
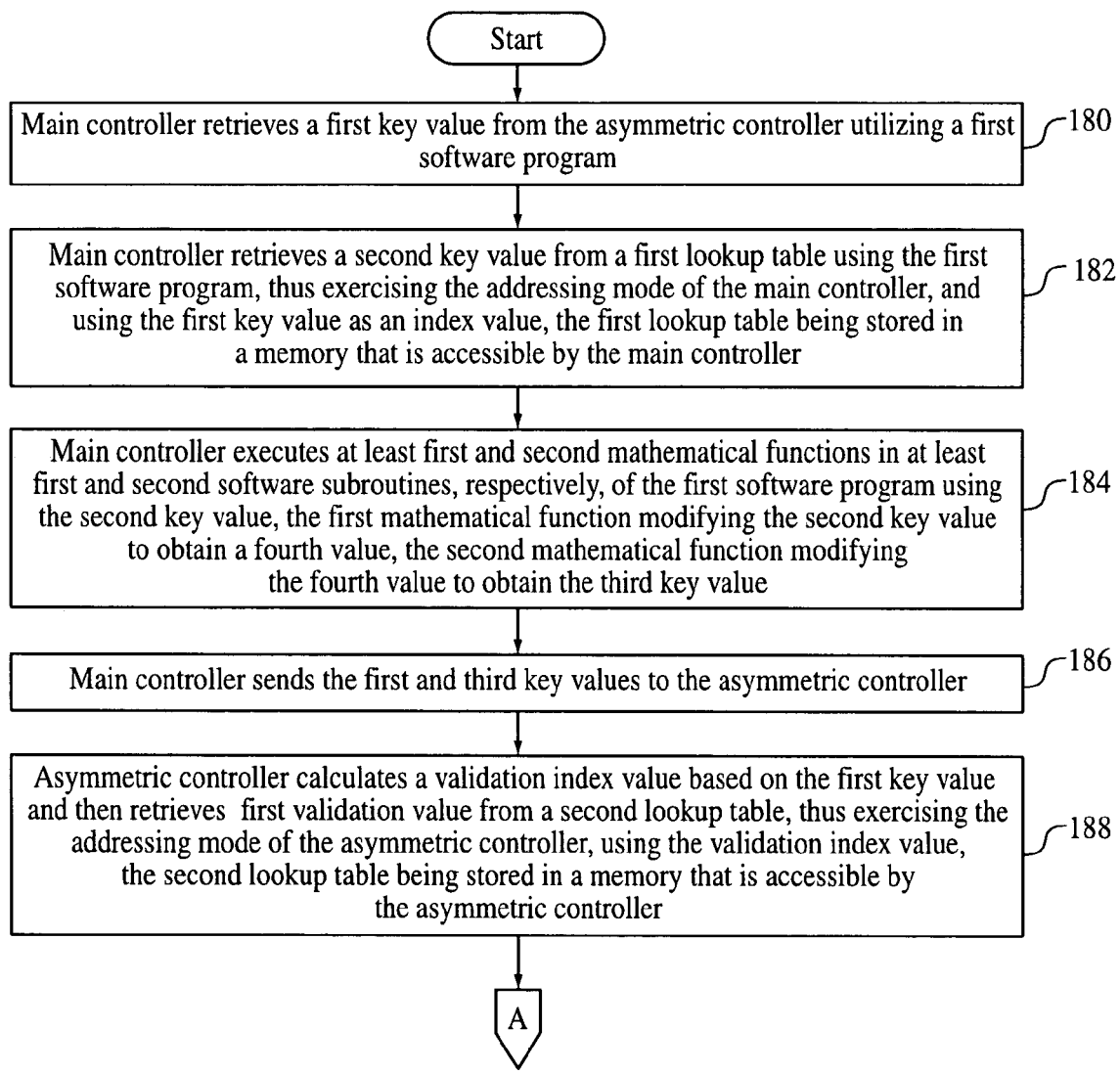
Figure 6:
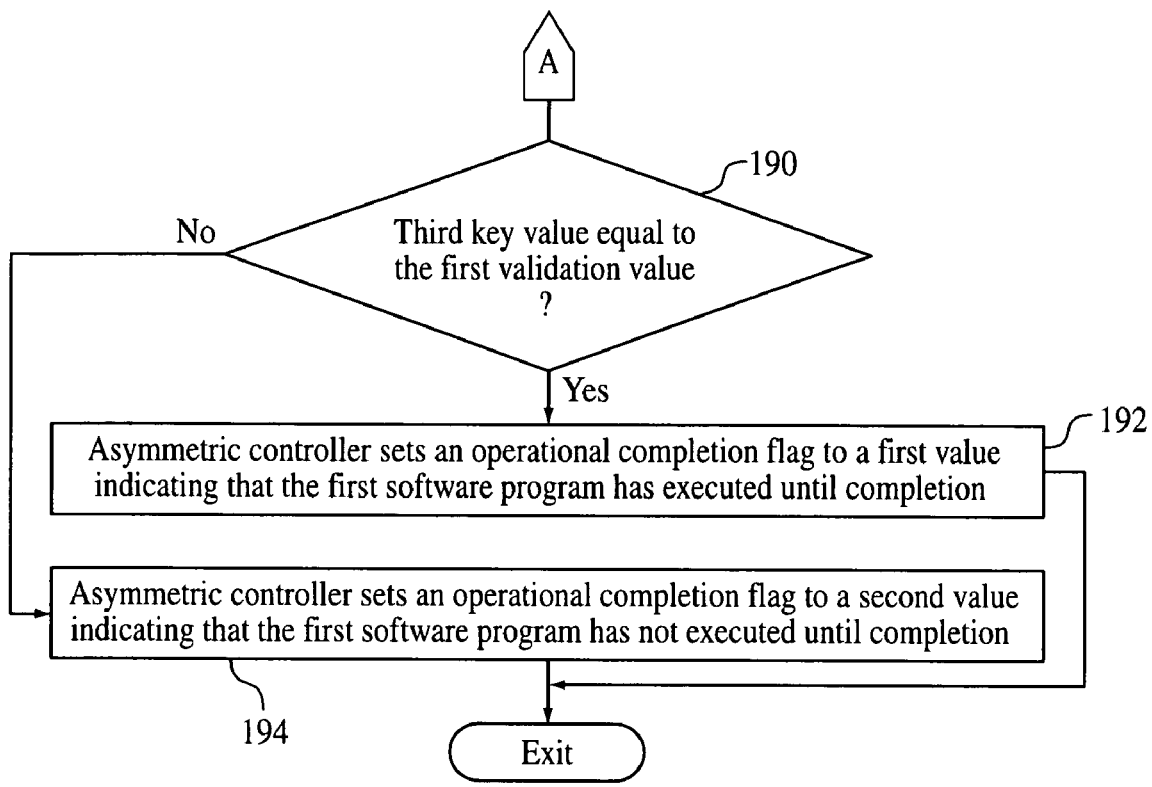

Referring to FIGS. 2, 5 and 6, after step 122 is completed, the step 124 is performed. At step 124, the main controller 12 initiates a Software Execution Completion Test at first predetermined time intervals. The step 124 is implemented utilizing steps 180-194.

At step 180, the main controller 12 retrieves a first key value from the asymmetric controller 14 utilizing a first software program.

At step 182, the main controller 12 retrieves a second key value from a first lookup table using the first software program, thus exercising the addressing mode of the main controller 12, and using the first key value as an index value. The first lookup table is stored in a memory that is accessible by the main controller 12.

At step 184, the main controller 12 executes at least first and second mathematical functions in at least first and second software subroutines, respectively, of the first software program using the second key value. The first mathematical function modifies the second key value to obtain a fourth value. The second mathematical function modifies the fourth value to obtain the third key value. Of course, in an alternate embodiment, a single mathematical function in a single software subroutine could be utilized to modify the second key value to obtain the third key value. In another alternate embodiment, a plurality of mathematical functions in a single software subroutine could be utilized to modify the second key value to obtain the third key value. In still another alternate embodiment, a plurality of mathematical functions in a plurality of software subroutines could be utilized to modify the second key value to obtain the third key value.

At step 186, the main controller 12 sends the first and third key values via the communication bus 20 to the asymmetric controller 14.

At step 188, the asymmetric controller 14 calculates a validation index value based on the first key value and then retrieves first validation value from a second lookup table, thus exercising the addressing mode of the asymmetric controller 14, using the validation index value. The second lookup table is stored in a memory that is accessible by the asymmetric controller 14.

At step 190, the asymmetric controller 14 makes a determination as to whether the third key value is equal to the first validation value. If the value of step 190 equals "yes", the method advances to step 192. Otherwise, the method advances to step 194.

At step 192, the asymmetric controller 14 sets an operational completion flag to a first value indicating that the first software program has executed until completion. After step 192, the method advances to step 126.

At step 194, the asymmetric controller 14 sets an operational completion flag to a second value indicating that the first software program has not executed until completion. After step 194, the method advances to step 126.

Figure 7:
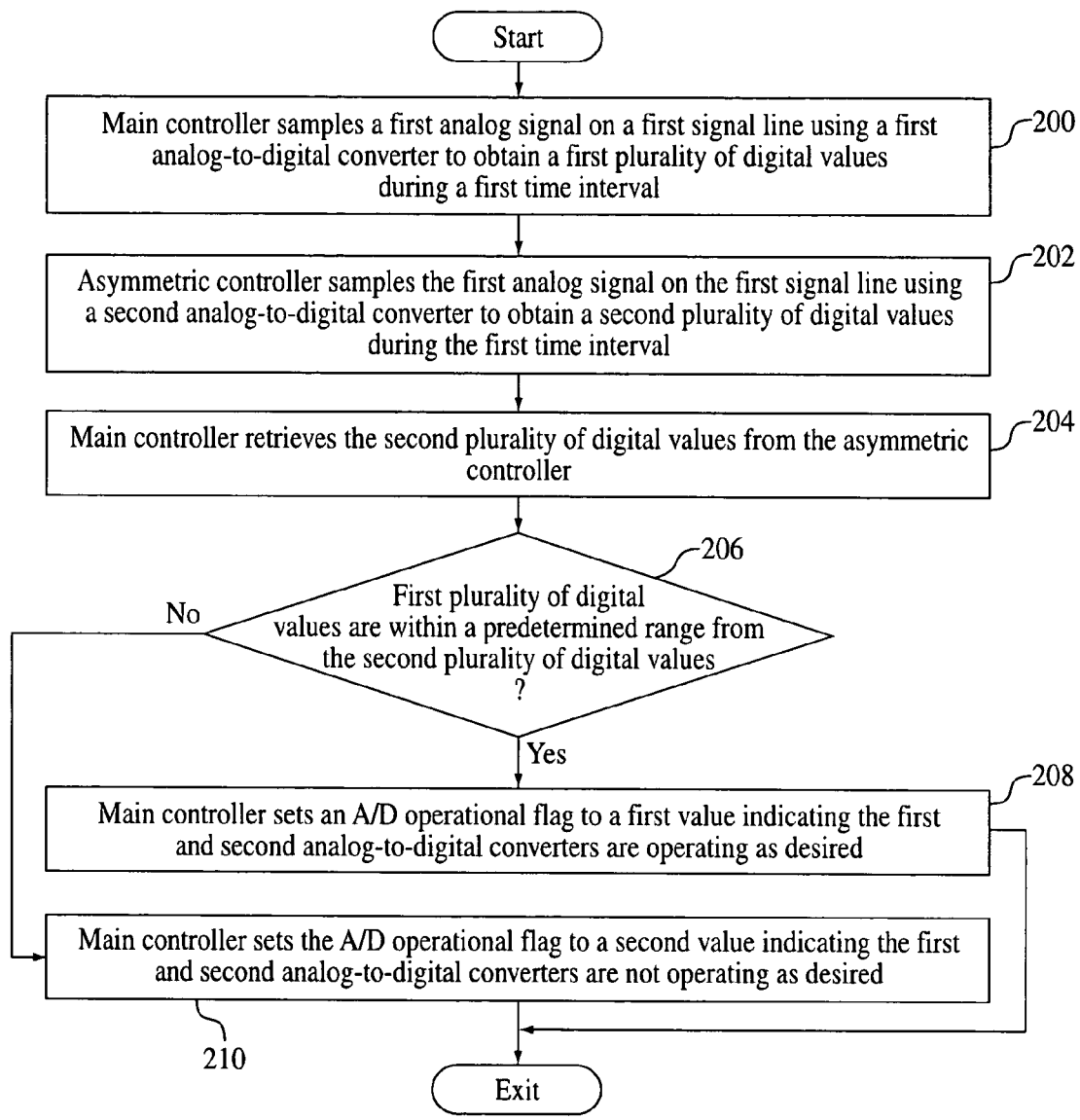

Referring to FIGS. 2 and 7, after completing step 124, the method performs step 126. At step 126, the main controller 12 initiates an Analog-to-Digital Test at second predetermined time intervals. The step 126 is implemented utilizing steps 200-210.

At step 200, the main controller 12 samples a first analog signal on signal line 28 using A/D converter 56 to obtain a first plurality of digital values during a first time interval.

At step 202, the asymmetric controller 14 samples the first analog signal on the first signal line 28 using an A/D converter 78 to obtain a second plurality of digital values during the first time interval.

At step 204, the main controller 12 retrieves the second plurality of digital values from the asymmetric controller 14.

At step 206, the main controller 12 makes a determination as to whether the first plurality of digital values are within a predetermined range from the second plurality of digital values. If the value of step 206 equals "yes", the method advances to step 208. Otherwise, the method advances to step 210.

At step 208, the main controller 12 sets an A/D operational flag to a first value indicating the A/D converters 56, 78 are operating as desired. After step 208, the method advances to step 128.

At step 210, the main controller 12 sets the A/D operational flag to a second value indicating the A/D converters 56, 78 are not operating as desired. After step 210, the method advances to step 128.

Figure 8:
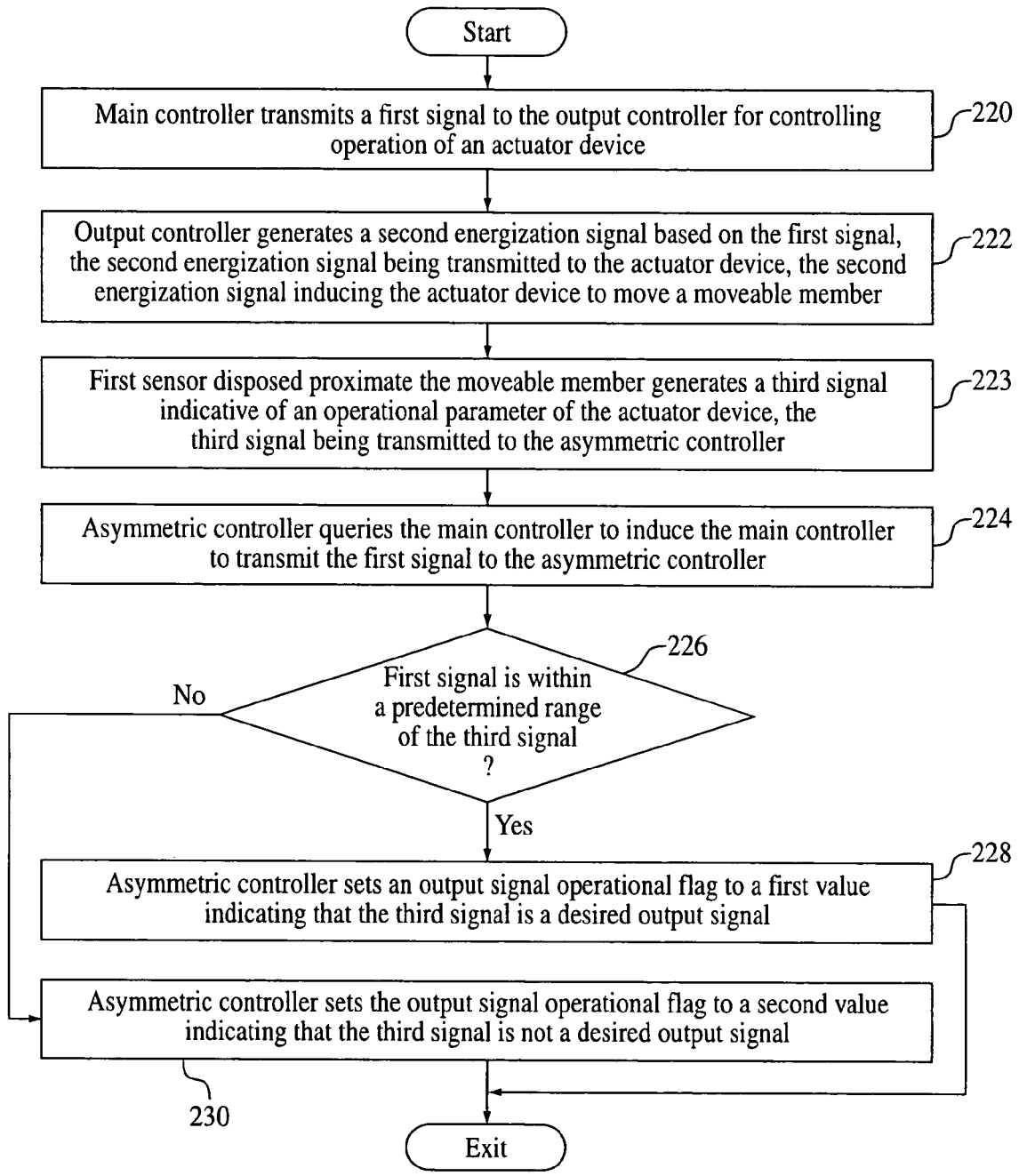

Referring to FIGS. 2 and 8, after completing step 126, the method performs step 128. At step 128, the main controller 12 initiates a Main Controller Output Test at third predetermined time intervals. The step 128 is implemented utilizing steps 220-230.

At step 220, the main controller 12 transmits a signal (C1) to the output controller 16 for controlling operation of an actuator device 26.

At step 222, the output controller 16 generates an energization signal (E1) based on the first signal. The energization signal being transmitted to the actuator device 26, and inducing the actuator device 26 to move a moveable member 110.

At step 223, the sensor 24 disposed proximate the moveable member 110 generates a signal (S1) indicative of an operational parameter of the actuator device 26. The signal (S1) is transmitted via signal line 40 to the asymmetric controller 14.

At step 224, the asymmetric controller 14 queries the main controller 12 to induce the main controller 12 to transmit the signal (C1) via communication bus 20 to the asymmetric controller 14.

At step 226, the asymmetric controller 14 makes a determination as to whether the signal (C1) is within a predetermined range of the signal (S1). If the value of step 226 equals "yes", the method advances to step 228. Otherwise, the method advances to step 230.

At step 228, the asymmetric controller 14 sets an output signal operational flag to a first value indicating that the signal (S1) is a desired output signal. After step 228, the method advances to step 130.

At step 230, the asymmetric controller 14 sets the output signal operational flag to a second value indicating that the signal (S1) is not a desired output signal. After step 230, the method advances to step 130.

Figure 9:
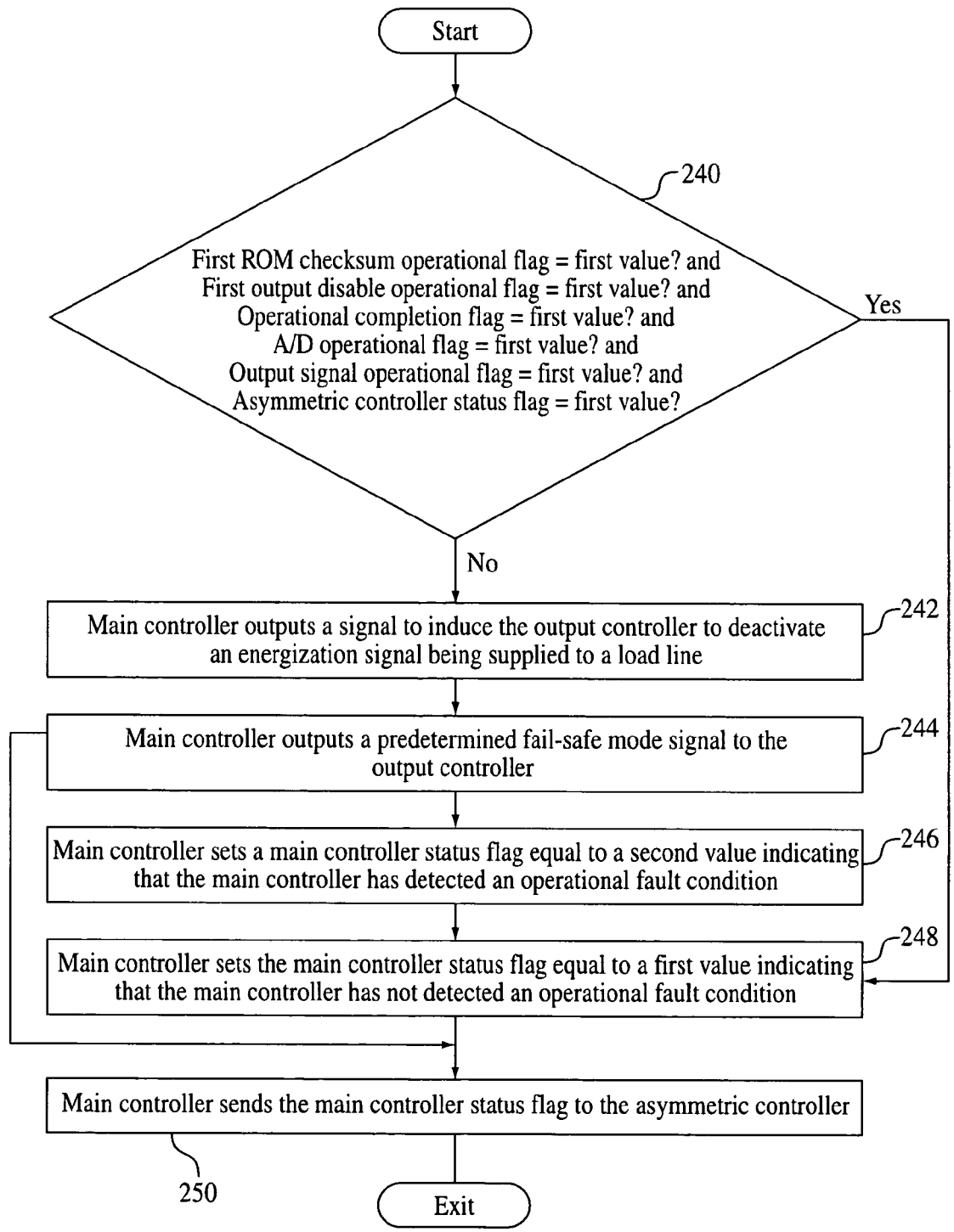

Referring to FIGS. 2 and 9, after completing step 128, the method performs step 130. At step 130, the main controller 12 initiates a Main Controller Operational Fault Management Procedure at fourth predetermined time intervals. The step 130 is implemented utilizing steps 240-250.

At step 240, in the main controller 12 makes a determination as to whether the following conditions are met: (i) first ROM checksum operational flag=first value, (ii) first output disable operational flag=first value, (iii) operational completion flag=first value, (iv) A/D operational flag=first value, (v) output signal operational flag=first value, and (vi) asymmetric controller status flag=first value. If the value of step 240 equals "no", indicating an operational fault condition, the method advances to step 242. Otherwise, the method advances to step 248.

At step 242, the main controller 12 outputs signal (C2) having a low logical level to induce the output controller 16 to deactivate the energization signal (E1) being supplied to the load line 42.

At step 244, the main controller 12 outputs a predetermined fail-safe mode signal via bus 22 to the output controller 16.

At step 246, the main controller 12 sets a main controller status flag equal to a second value indicating that the main controller 12 has detected an operational fault condition. After step 246, the method advances to step 250.

At step 248, the main controller 12 sets the main controller status flag equal to a first value indicating that the main controller 12 has not detected an operational fault condition. After step 248, the method advances to step 250.

At step 250, the main controller 12 sends the main controller status flag to the asymmetric controller 14.

Figure 10:
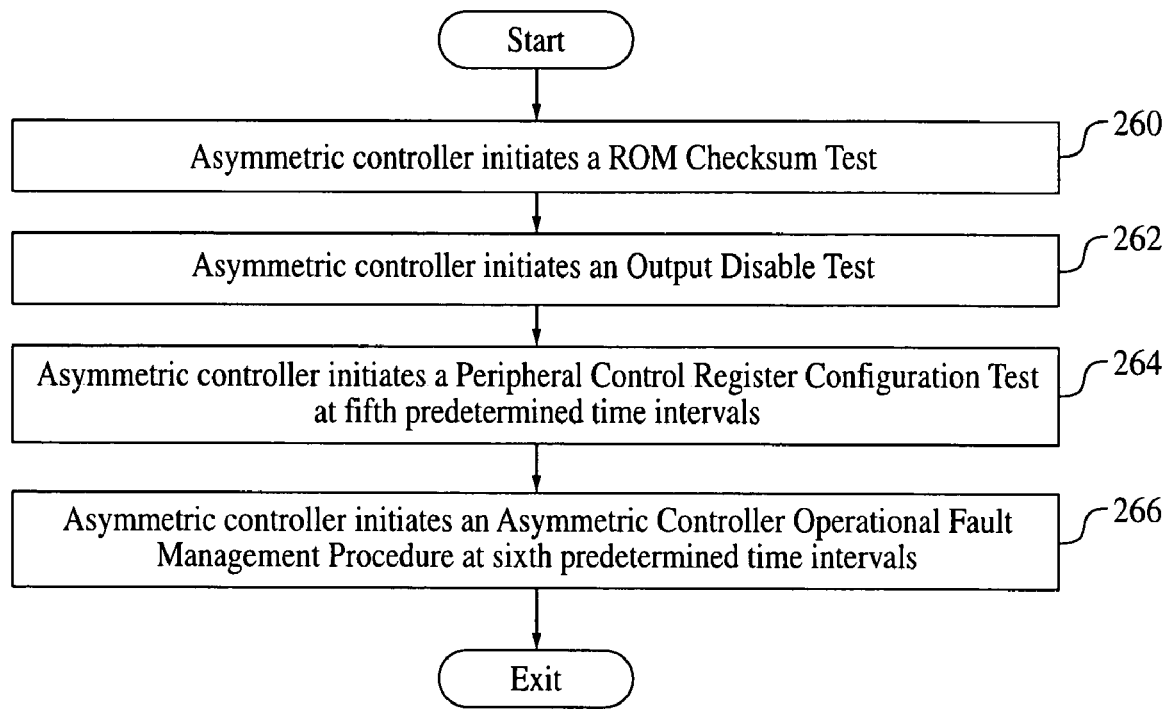

Referring to FIG. 10, a method for validating operation of the control system 10 in accordance with another exemplary embodiment will now be explained. The method is implemented utilizing software algorithms in the main controller 12, the asymmetric controller 14, and the output controller 16—and is initiated by the asymmetric controller 14.

Figure 11:
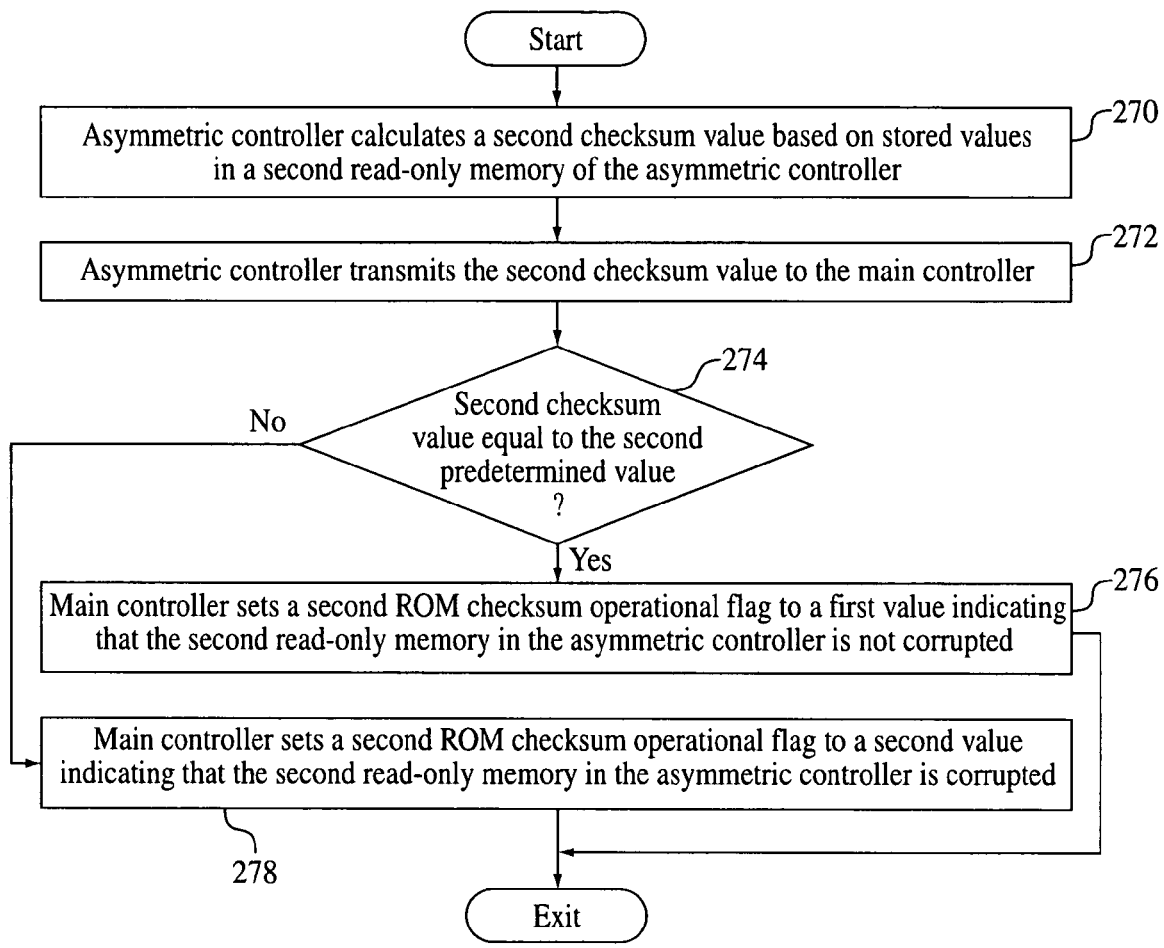

At step 260, the asymmetric controller 14 initiates a ROM Checksum Test. Referring to FIG. 11, the step 260 is implemented utilizing steps 270-278.

At step 270, the asymmetric controller 14 calculates a second checksum value based on stored values in the ROM 74 of the asymmetric controller 14.

At step 272, the asymmetric controller 14 transmits the second checksum value to the main controller 12.

At step 274, the main controller 12 makes a determination as to whether the second checksum value is equal to the second predetermined value. If the value of step 274 equals "yes", the method advances step 276. Otherwise, the method advances to step 278.

At step 276, the main controller 12 sets a second ROM checksum operational flag to a first value indicating that the ROM 74 in the asymmetric controller 14 is not corrupted. After step 276, the method advances to step 262.

At step 278, the main controller 12 sets a second ROM checksum operational flag to a second value indicating that the ROM 74 in the asymmetric controller 14 is corrupted. After step 278, the method advances to step 262.

Figure 12:
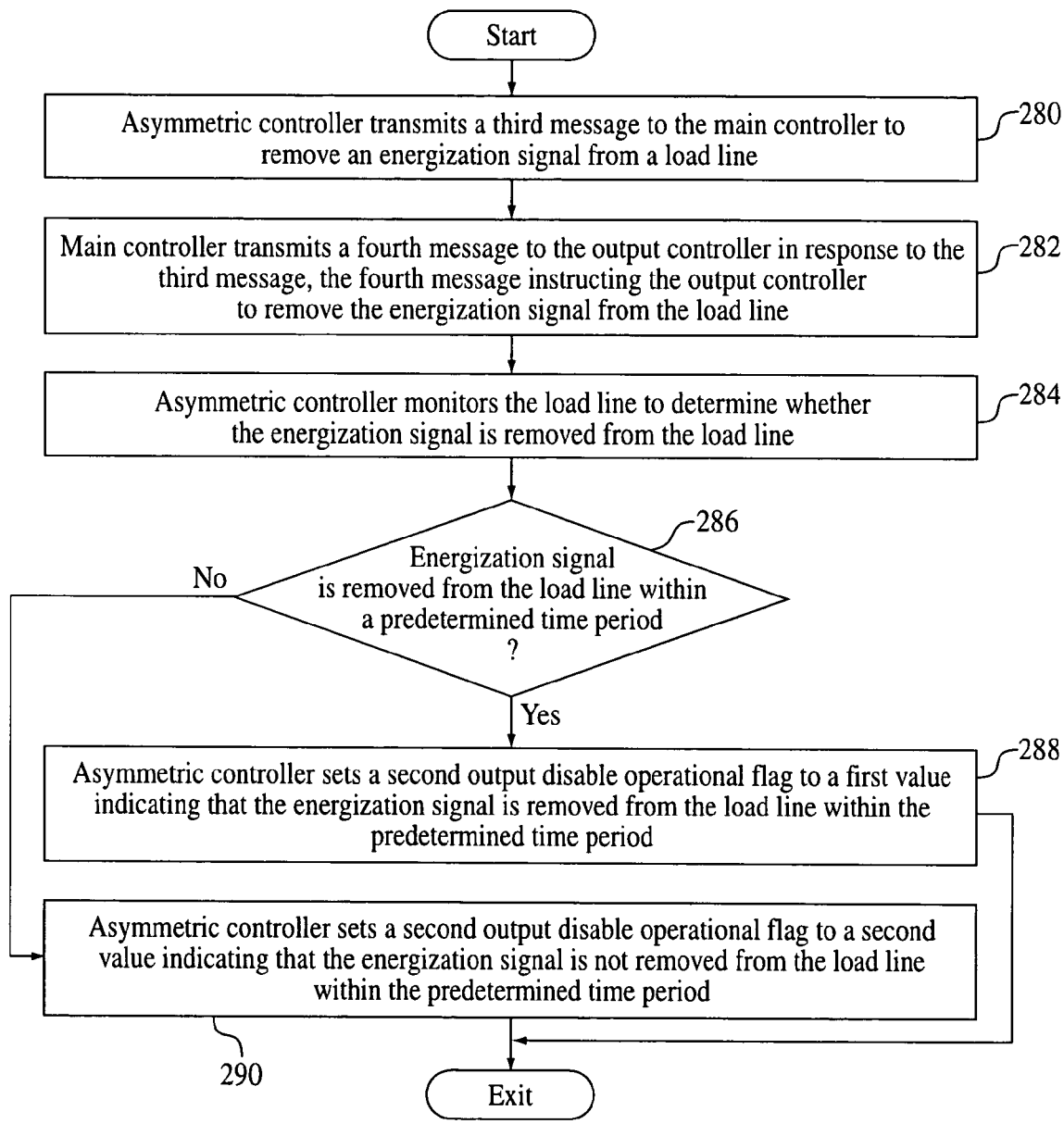

Referring to FIGS. 10 and 12, after completing step 260, the method performs step 262. At step 262, the asymmetric controller 14 initiates an Output Disable Test. The step 260 is implemented utilizing steps 280-290.

At step 280, the asymmetric controller 14 transmits a third message via bus 20 to the main controller 12 to remove the energization signal (E1) from the load line 42.

At step 282, the main controller 12 transmits a fourth message via bus 22 to the output controller 16 in response to the third message. The fourth message instructs the output controller 16 to remove the energization signal (E1) from the load line 42.

At step 284, the asymmetric controller 14 monitors the load line 42 to determine whether the energization signal (E1) is removed from the load line 42.

At step 286, the asymmetric controller 14 makes a determination as to whether the energization signal (E1) is removed from the load line 42 within a predetermined time period. If the value of step 286 equals "yes", the method advances to step 288. Otherwise, the method advances to step 290.

At step 280, the asymmetric controller 14 sets a second output disable operational flag to a first value indicating that the energization signal (E1) is removed from the load line 42 within the predetermined time period. After step 288, the method advances to step 264.

At step 290, the asymmetric controller 14 sets a second output disable operational flag to a second value indicating that the energization signal (E1) is not removed from the load line 42 within the predetermined time period. After step 290, the method advances to step 264.

Figure 13:
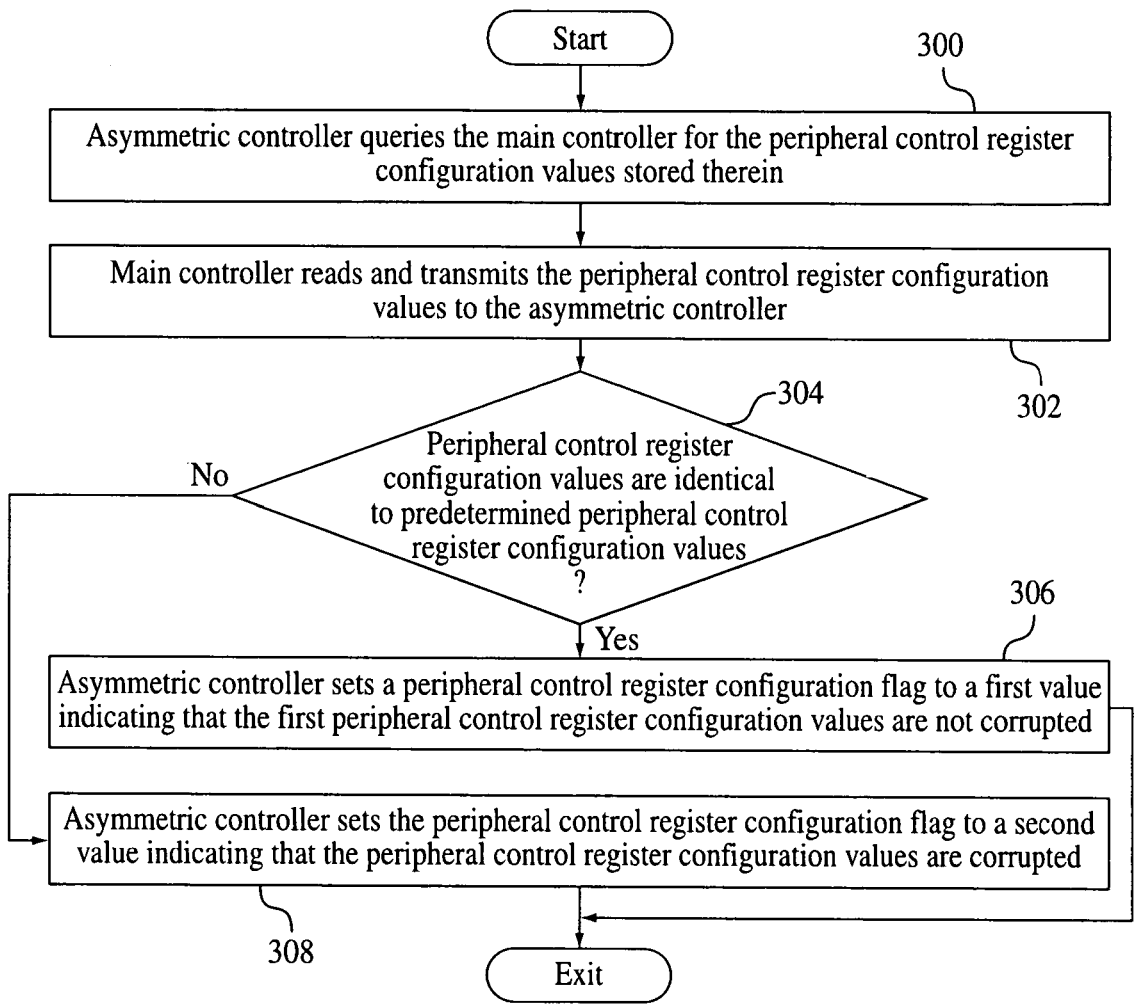

Referring to FIGS. 10 and 13, after completing step 262, the method performs step 264. At step 264, the asymmetric controller 14 initiates a Peripheral Control Register Configuration Test at fifth predetermined time intervals. The step 264 is implemented utilizing steps 300-308.

At step 300, the asymmetric controller 14 queries the main controller 12 for the peripheral control register configuration values stored therein.

At step 302, the main controller 12 reads and transmits the peripheral control register configuration values to the asymmetric controller 14.

At step 304, the asymmetric controller 14 makes a determination as to whether the peripheral control register configuration values are identical to predetermined peripheral control register configuration values. If the value of step 304 equals "yes", the method advances to step 306. Otherwise, the method advances to step 308.

At step 306, the asymmetric controller 14 sets a peripheral control register configuration flag to a first value indicating that the first peripheral control register configuration values are not corrupted. After step 306, the method advances to step 266.

At step 308, the asymmetric controller 14 sets the peripheral control register configuration flag to a second value indicating that the peripheral control register configuration values are corrupted. After step 308, the method advances to step 266.

Figure 14:
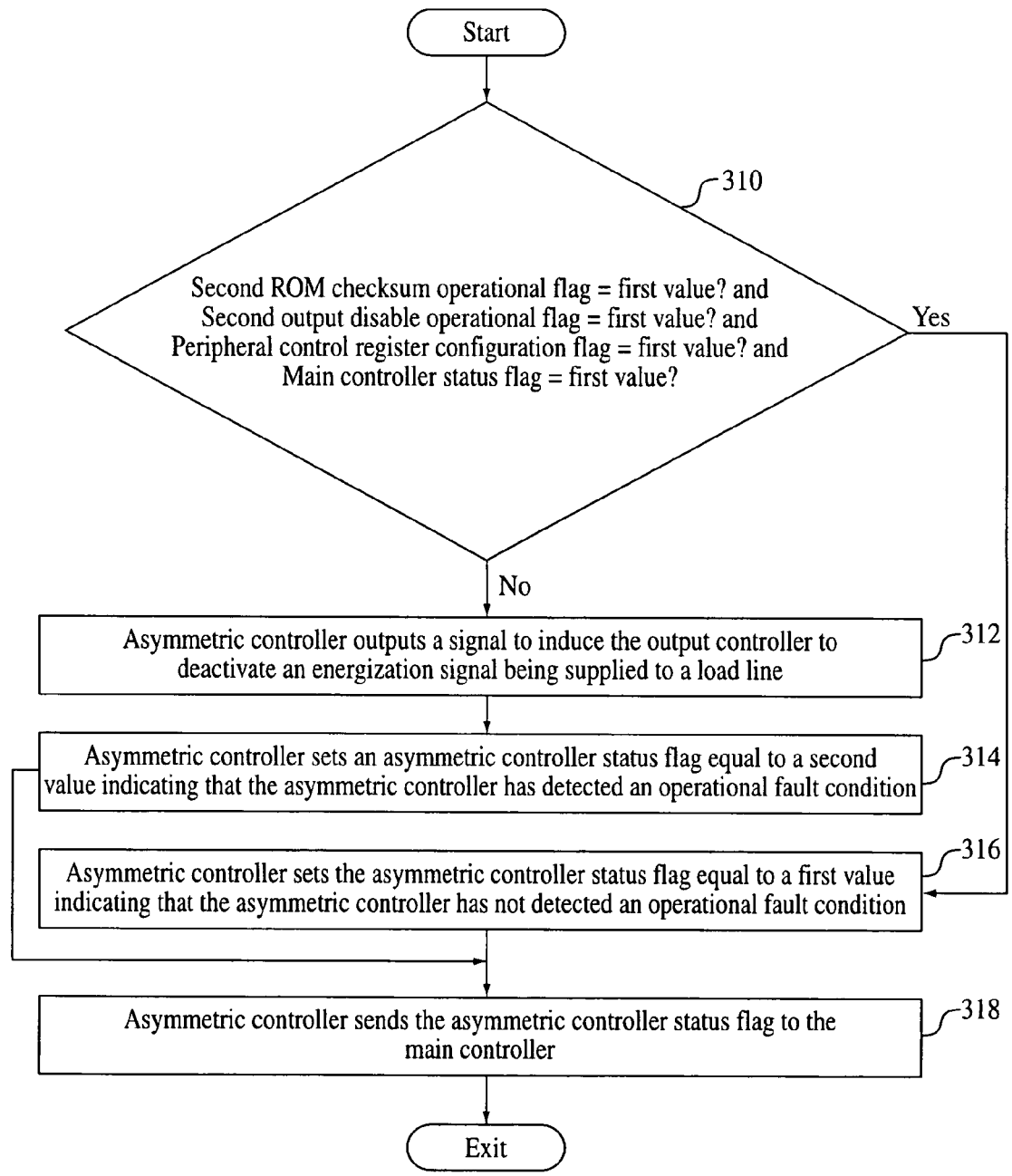

Referring to FIGS. 10 and 14, after completing step 264, the method performs step 266. At step 266, the asymmetric controller 14 initiates an Asymmetric Controller Operational Fault Management Procedure at sixth predetermined time intervals. The step 266 is implemented utilizing steps 310-318.

At step 310, the asymmetric controller 14 makes a determination as to whether the following conditions are met: (i) second ROM checksum operational flag=first value, (ii) second output disable operational flag=first value, (iii) peripheral control register configuration flag=first value, and (iv) main controller status flag=first value. If the value of step 310 equals "no", the method advances to 312. Otherwise, the method advances to step 316.

At step 312, the asymmetric controller 14 outputs a signal (C4) having a low logic level to induce the output controller 16 to deactivate an energization signal (E1) being supplied to the load line 42.

At step 314, the asymmetric controller 14 sets an asymmetric controller status flag equal to a second value indicating that the asymmetric controller 14 has detected in operational fault condition. After step 314, the method advances to step 318.

At step 316, the asymmetric controller 14 sets the asymmetric controller status flag equal to a first value indicating that the asymmetric controller 14 has not detected an operational fault condition.

At step 318, the asymmetric controller 14 sends the asymmetric controller status flag to the main controller 12. After step 318, the method is exited.

The control system and the method for validating operation of the control system represent a substantial advantage over other systems and methods. In particular, the method determines whether a software program is being executed until completion in a controller and further determines whether the software steps in a software program are being executed in a desired sequence.

As described above, an exemplary embodiment can be embodied in the form of computer-implemented processes and apparatuses for practicing those processes. The exemplary embodiment can also comprise computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The exemplary embodiment can also comprise computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention is described with reference to exemplary embodiments, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiments disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

What is claimed is:

1. A method for validating operation of a control system, the control system having a first controller operably communicating with a second controller, the first and second controllers having first and second read-only memories, respectively, the method comprising:
   executing a first software program in the first controller that retrieves a first key value from the second controller;
   retrieving a second key value from a table using the first key value as an index value, the table being stored in a memory that is accessible by the first software program;
   executing at least one mathematical operation in the first software program using at least the second key value to obtain a third key value;
   sending the first and third key values from the first controller to the second controller;
   determining a first validation value based on the first key value utilizing the second controller; and
   comparing the third key value to the first validation value using the second controller and indicating that the first software program has executed until completion when the third key value is equal to the first validation value.

2. The method of claim 1, wherein performing at least one mathematical operation in the first software program using at least the second key value to obtain the third key value, comprises:
   executing a plurality of mathematical operations in a predetermined sequence in a plurality of software subroutines of the first software program using at least the second key value to obtain the third key value.

3. The method of claim 1, further comprising indicating that the first software program has not executed until completion when the third key value is not equal to the first validation value.

4. The method of claim 3, further comprising disabling an output signal from the first controller when the first software program has not executed until completion.

5. The method of claim 1, wherein the mathematical operation comprises at least one of a multiplication operation, a division operation, an addition operation, and a subtraction operation.

6. The method of claim 1, further comprising:
   calculating a first checksum value based on stored values in the first read-only memory using the first controller;
   transmitting the first checksum value from the first controller to the second controller;
   comparing the first checksum value to a first predetermined value using the second controller; and
   indicating the first read-only memory is not corrupted when the first checksum value is equal to the first predetermined value.

7. The method of claim 6, further comprising:
   calculating a second checksum value based on stored values in the second read-only memory using the second controller;
   transmitting the second checksum value from the second controller to the first controller;
   comparing the second checksum value to a second predetermined value using the first controller;
   indicating the second read-only memory is not corrupted when the second checksum value is equal to the second predetermined value.

8. The method of claim 1, wherein the first and second controllers further comprise first and second analog-to-digital converters, respectively, the method further comprising:
   sampling a first analog signal on a first signal line using the first analog-to-digital converter to obtain a first plurality of digital values;
   sampling the first analog signal on the first signal line using the second analog-to-digital converter to obtain a second plurality of digital values; and
   indicating the first and second analog-to-digital converters are operating as desired when the first plurality of digital values are substantially similar to the second plurality of digital values.

9. The method of claim 8, wherein the step of indicating the first and second analog-to-digital converters are operating as desired comprises determining whether each digital value of the first plurality of digital values is within a predetermined range of each corresponding digital value of the second plurality of digital values.

10. The method of claim 1, further comprising:
    transmitting a first signal from the first controller to an output controller;
    generating a second signal using the output controller based on the first signal, the second signal being transmitted to an actuator device, the second signal inducing the actuator device to move a moveable member;
    generating a third signal using a sensor that monitors movement of the moveable member, the third signal being transmitted to the second controller, the third signal being indicative of an operational parameter of the actuator device;
    querying the first controller to induce the first controller to transmit the first signal to the second controller; and
    comparing the first signal to the third signal using the second controller to determine whether the third signal is a desired output signal.

11. The method of claim 10, wherein comparing the first signal to the third signal comprises determining whether the third signal is within a predetermined range of the first signal.

12. The method of claim 1, further comprising:
querying the first controller for peripheral control register configuration values stored therein, using a second controller;
transmitting the peripheral control register configuration values from the first controller to the second controller; and
comparing the peripheral control register configuration values with predetermined peripheral control register configuration values stored in the second controller to determine whether the peripheral control register configuration values are corrupted.

13. The method of claim 12, wherein the peripheral control register configuration values are not corrupted when the peripheral control register configuration values are identical to the predetermined peripheral control register data.

14. The method of claim 1, further comprising:
transmitting a first message from the first controller to the second controller;
transmitting a second message from the second controller to an output controller in response to the first message, the second message instructing the output controller to remove an energization signal from a load line;
monitoring the load line using the first controller to determine whether the energization signal is removed from the load line; and
indicating a fault condition if the energization signal is not removed from the load line within a predetermined time period.

15. The method of claim 14, further comprising:
transmitting a third message from the second controller to the first controller;
transmitting a fourth message from the first controller to the output controller in response to the third message, the fourth message instructing the output controller to remove the energization signal from the load line;
monitoring the load line using the second controller to determine whether the energization signal is removed from the load line; and
indicating the fault condition if the energization signal is not removed from the load line within the predetermined time period.

16. A control system, comprising:
a first controller configured to execute a first software program; and a second controller configured to operably communicate with the first controller, the first software program configured to retrieve a first key value from the second controller, the first software program further configured to retrieve a second key value from a table using the first key value as an index value, the table being stored in a memory that is accessible by the first software program, the first software program further configured to execute at least one mathematical operation using at least the second key value to obtain a third key value, the first software program further configured to send the first and third key values from the first controller to the second controller, the second controller further configured to determine a first validation value based on the first key value, the second controller further configured to compare the third key value to the first validation value and to indicate that the first software program has executed until completion when the third key value is equal to the first validation value.

17. The control system of claim 16, wherein the first software program comprises a plurality of software subroutines, the first software program being configured to perform a plurality of mathematical operations in a predetermined sequence in the plurality of software subroutines using at least the second key value to obtain the third key value.

18. The control system of claim 16, wherein the first controller is further configured to calculate a first checksum value based on stored values in the first read-only memory, the first controller further configured to transmit the first checksum value to the second controller, the second controller further configured to compare the first checksum value to a first predetermined value, the second controller further configured to indicate that the first read-only memory is not corrupted when the first checksum value is equal to the first predetermined value.

19. The control system of claim 16, wherein the first and second controllers further have first and second analog-to-digital converters, respectively, the first analog-to-digital converter configured to sample a first analog signal on a first signal line to obtain a first plurality of digital values, the second analog-to-digital converter configured to sample the first analog signal on the first signal line to obtain a second plurality of digital values, the first controller is further configured to indicate the first and second analog-to-digital converters are operating as desired when the first plurality of digital values are substantially similar to the second plurality of digital values.

20. The control system of claim 16, further comprising:
an output controller operably coupled to the first and second controllers;
an actuator device operably coupled to the output controller, the actuator device having a moveable member;
a first sensor configured to monitor movement of the moveable member;
the first controller further configured to transmit a first signal to the output controller, the output controller configured to generate a second signal based on the first signal, the second signal being transmitted to the actuator device, the second signal inducing the actuator device to move the moveable member; and
the first sensor configured to generate a third signal indicative of an operational parameter of the actuator device, the third signal being transmitted to a second controller, the second controller further configured to query the first controller to induce the first controller to transmit the first signal to the second controller, the second controller further configured to compare the first signal to the third signal to determine whether the third signal is a desired output signal.

21. The control system of claim 16, wherein the second controller is further configured to query the first controller for the peripheral control register configuration values stored therein, the first controller configured to transmit the peripheral control register configuration values to the second controller in response to the query, the second controller further configured to compare the peripheral control register configuration values with predetermined peripheral control register configuration values stored in the second controller to determine whether the peripheral control register configuration values are corrupted.

22. The control system of claim 21, wherein the peripheral control register configuration values are not corrupted when the peripheral control register configuration values are identical to the predetermined peripheral control register configuration values.

23. The control system of claim 16, further comprising:
an output controller operably communicating with the first and second controllers, the output controller operably coupled to a load line, the first controller further configured to transmit a first message to the second controller, the second controller further configured to transmit a second message to the output controller in response to the first message, the second message instructing the output controller to remove an energization signal from the load line, the first controller further configured to monitor the load line to determine whether the energization signal is removed from the load line, the first controller further configured to indicate a fault condition if the energization signal is not removed from the load line within a predetermined time period.

* * * * *